United States Patent
Lindstrom et al.

(10) Patent No.: US 11,694,706 B2
(45) Date of Patent: *Jul. 4, 2023

(54) ADAPTIVE ENERGY LIMITING FOR TRANSIENT NOISE SUPPRESSION

(71) Applicant: Google LLC, Mountain View, CA (US)

(72) Inventors: John Fredric Lindstrom, Stockholm (SE); Carl Samuel Sonning, Stockholm (SE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,950

(22) Filed: Dec. 31, 2021

(65) Prior Publication Data

US 2022/0122625 A1 Apr. 21, 2022

Related U.S. Application Data

(63) Continuation of application No. 16/702,270, filed on Dec. 3, 2019, now Pat. No. 11,217,262.
(Continued)

(51) Int. Cl.
*G10L 21/0216* (2013.01)
*G10L 21/0264* (2013.01)
(Continued)

(52) U.S. Cl.
CPC ...... *G10L 21/0216* (2013.01); *G10L 21/0208* (2013.01); *G10L 21/0232* (2013.01);
(Continued)

(58) Field of Classification Search
CPC . G10L 21/0208; G10L 21/0232; G10L 25/30; G10L 21/02
See application file for complete search history.

(56) References Cited

U.S. PATENT DOCUMENTS 6,175,634 B1 * 1/2001 Graumann .............. H04M 9/10
381/94.1
8,818,799 B2 8/2014 Enborn et al.
(Continued)

FOREIGN PATENT DOCUMENTS

WO 2021101637 5/2021

OTHER PUBLICATIONS

"International Search Report and Written Opinion", PCT Application No. PCT/US2020/055381, dated Jan. 29, 2021, 8 pages.
(Continued)

*Primary Examiner* — Samuel G Neway
(74) *Attorney, Agent, or Firm* — Colby Nipper PLLC

(57) ABSTRACT

The present disclosure describes aspects of adaptive energy limiting for transient noise suppression. In some aspects, an adaptive energy limiter sets a limiter ceiling for an audio signal to full scale and receives a portion of the audio signal. For the portion of the audio signal, the adaptive energy limiter determines a maximum amplitude and evaluates the portion with a neural network to provide a voice likelihood estimate. Based on the maximum amplitude and the voice likelihood estimate, the adaptive energy limiter determines that the portion of the audio signal includes noise. In response to determining that the portion of the audio signal includes noise, the adaptive energy limiter decreases the limiter ceiling and provides the limiter ceiling to a limiter module effective to limit an amount of energy of the audio signal. This may be effective to prevent audio signals from carrying full energy transient noise into conference audio.

20 Claims, 8 Drawing Sheets

Related U.S. Application Data

(60) Provisional application No. 62/936,751, filed on Nov. 18, 2019.

(51) Int. Cl.
| | | |
|---|---|---|
| *G10L 25/30* | (2013.01) | |
| *G10L 25/84* | (2013.01) | |
| *H04M 3/56* | (2006.01) | |
| *G10L 21/0208* | (2013.01) | |
| *G10L 21/0232* | (2013.01) | |
| *G10L 25/78* | (2013.01) | |

(52) U.S. Cl.
CPC .......... *G10L 21/0264* (2013.01); *G10L 25/30* (2013.01); *G10L 25/84* (2013.01); *H04M 3/568* (2013.01); *G10L 2025/786* (2013.01)

(56) References Cited

U.S. PATENT DOCUMENTS

| | | | |
|---|---|---|---|
| 9,467,569 B2 | 10/2016 | Femal | |
| 10,083,707 B1* | 9/2018 | Ou | G10L 25/84 |
| 11,217,262 B2* | 1/2022 | Lindstrom | G10L 21/0232 |
| 2005/0143989 A1* | 6/2005 | Jelinek | G10L 21/0208 704/226 |
| 2010/0145689 A1* | 6/2010 | Li | G10L 21/0208 704/E11.003 |
| 2014/0072143 A1* | 3/2014 | Liu | G06F 3/165 381/94.5 |
| 2018/0240472 A1 | 8/2018 | Vickers et al. | |
| 2019/0066654 A1* | 2/2019 | Dickins | G10K 11/17853 |
| 2021/0151065 A1* | 5/2021 | Lindstrom | G10L 21/0232 |
| 2022/0122625 A1* | 4/2022 | Lindstrom | G10L 21/0216 |

OTHER PUBLICATIONS

"Non-Final Office Action", U.S. Appl. No. 16/702,270, dated May 26, 2021, 9 pages.

"Notice of Allowance", U.S. Appl. No. 16/702,270, dated Sep. 2, 2021, 7 pages.

"International Preliminary Report on Patentability", Application No. PCT/US2020/055381, dated May 17, 2022, 7 pages.

"Extended European Search Report", EP Application No. 22180992.4, dated Oct. 6, 2022, 6 pages.

"Foreign Office Action", IN Application No. 202247022137, dated Aug. 16, 2022, 6 pages.

* cited by examiner

512 ─↘

```
┌──────────┐                    ┌──────────┐
│   To     │                    │   From   │
│ FIG. 5A  │                    │ FIG. 5A  │
└──────────┘                    └──────────┘
```

Determine, based on the IVL, an aggregate speech likelihood estimate (ASLE) for the audio signal
514

Determine whether the maximum amplitude exceeds the moving average and the IVL indicates that the frame of audio is noise
516

Do not decrease the limiter ceiling
518

Decrease the limiter ceiling based on the ASLE
520

Provide a current value of the limiter ceiling to a limiter module to scale the audio signal to not exceed the current value
522

FIG. 5B

ADAPTIVE ENERGY LIMITING FOR TRANSIENT NOISE SUPPRESSION

CROSS-REFERENCE TO RELATED APPLICATIONS

This application is a continuation of and claims priority to U.S. Non-Provisional patent application Ser. No. 16/702,270, filed on Dec. 3, 2019, which in turn claims priority to U.S. Provisional Application No. 62/936,751, filed Nov. 18, 2019, the disclosures of which are incorporated by reference.

BACKGROUND

Audio conferences or video conferences often include many participants, with one or few of the participants actively speaking at any given time. When not speaking, the other participants typically produce noise, which may be picked up by their microphones and fed into the audio of the conference for all participants to hear. Example noises generated by conference participants may include typing on a keyboard, placing a coffee cup on a table, shuffling paper, moving chairs, shutting doors, and so on. Some of these noises have a transient characteristic that, unlike static or recurrent noise, prevent suppression through conventional noise reduction techniques. Additionally, audio energy of transient noise is typically as high, or higher, than energy levels associated with speech of the conference participants. As such, these transient noises are often fed into the conference audio as unsuppressed energy, resulting in noise that may disrupt the speaker and listeners, overpower the speaker's voice, trigger residual echo suppression, falsely trigger audio or video switch schemes, or the like.

SUMMARY

This disclosure describes apparatuses and techniques of adaptive energy limiting for transient noise suppression. In some aspects, a method for adaptive energy limiting includes setting a limiter ceiling for an audio signal to full scale and receiving a portion of the audio signal. The method then determines a maximum amplitude of the portion of the audio signal and evaluates the portion of the audio signal with a neural network to provide a voice likelihood estimate for the portion of the audio signal. Based on the maximum amplitude and the voice likelihood estimate, the method determines that the portion of the audio signal includes noise. In response to determining that the portion of the audio signal includes noise, the method decreases the limiter ceiling. The limiter ceiling is then provided to a limiter module through which the audio signal passes to limit an amount of energy of the audio signal. By so doing, the audio signal may be prevented from carrying full energy transient noise into conference audio or subsequent audio processes, such as speaker selection for video conferencing.

In other aspects, an apparatus includes a network interface to receive or transmit an audio signal over a data network and a limiter module to limit energy of the audio signal. The apparatus also includes a hardware-based processor associated with the data interface and storage media storing processor-executable instructions for an adaptive energy limiter. The adaptive energy limiter is implemented to set a limiter ceiling for the audio signal to full scale and provide, from the audio signal, a frame of audio that corresponds to a duration of audio from the audio signal. The adaptive energy limiter then determines, for the frame of audio, a maximum amplitude of the audio signal and evaluates the frame of audio with a neural network to provide a voice likelihood estimate for the frame of audio. Based on the maximum amplitude and the voice likelihood estimate, the adaptive energy limiter determines that the frame of audio includes noise. The adaptive energy limiter then decreases the limiter ceiling in response to the determination that the frame of audio includes noise and provides, to the limiter module, the limiter ceiling to reduce the energy of the audio signal.

In yet other aspects, a system comprises a hardware-based processor operably associated with an audio interface or a data interface by which an audio signal is received and storage media storing processor-executable instructions for an adaptive energy limiter. The adaptive energy limiter is implemented to set a limiter ceiling for the audio signal to full scale and generate, based on the audio signal, a frame of audio that corresponds to a duration of audio from the audio signal. The adaptive energy limiter then determines, for the frame of audio, a maximum amplitude of the audio signal and evaluates the frame of audio with a neural network to provide a voice likelihood estimate for the frame of audio. Based on the maximum amplitude and the voice likelihood estimate, the adaptive energy limiter determines that the frame of audio includes noise. The adaptive energy limiter then decreases the limiter ceiling in response to the determination that the frame of audio includes noise and provides, to a limiter module, the limiter ceiling to reduce the energy of the audio signal.

The details of one or more implementations of adaptive energy limiting for transient noise suppression are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

This specification describes apparatuses and techniques of adaptive energy limiting for transient noise suppression with reference to the following drawings. The same numbers are used throughout the drawings to reference like features and components:

FIGS. 5A and 5B illustrate an example method for scaling an audio signal based on an instantaneous voice likelihood provided by a neural network-enabled voice activity detector.

DETAILED DESCRIPTION

Overview

Figure 1:
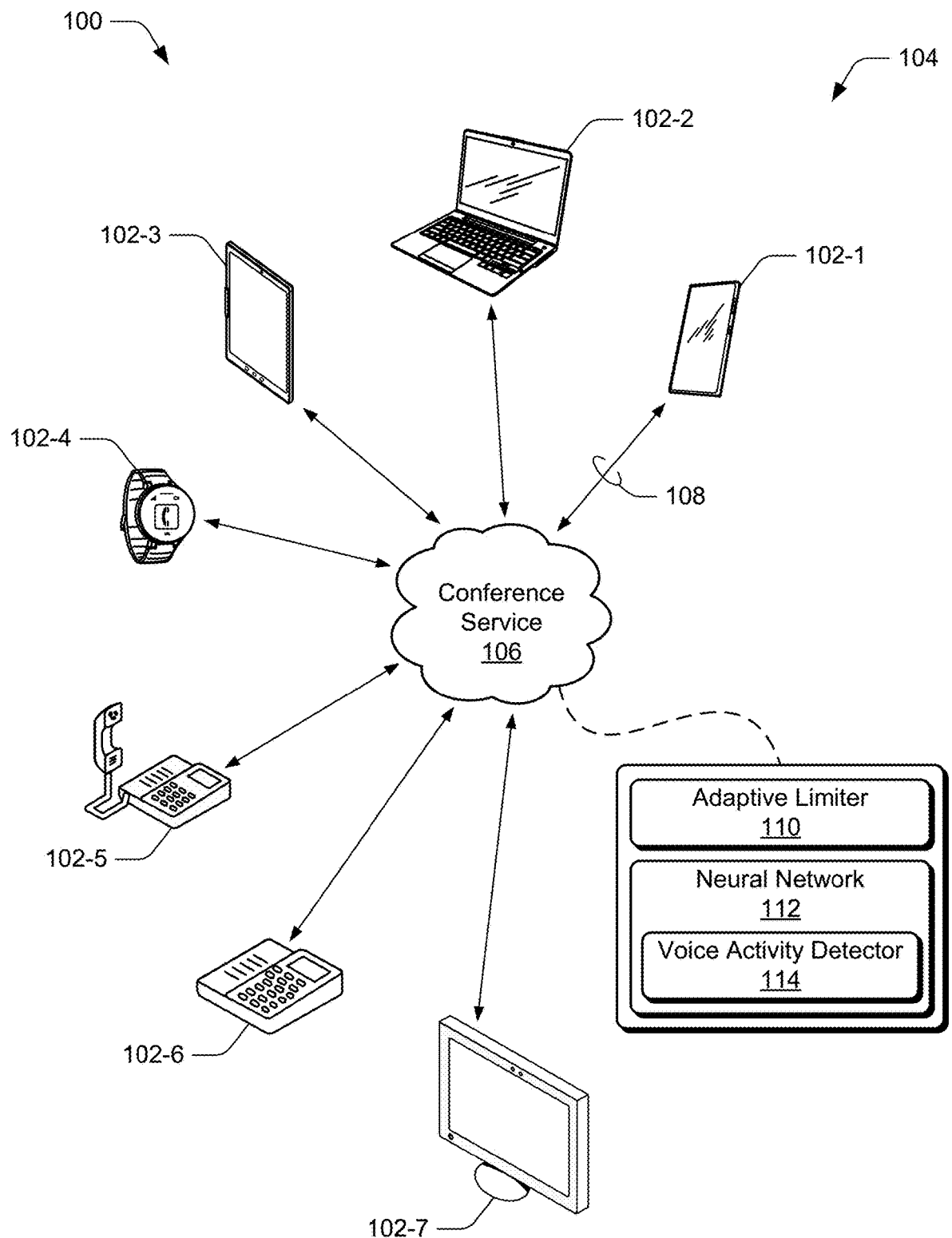
FIG. 1 illustrates an example conferencing environment in which various aspects of adaptive energy limiting for transient noise suppression can be implemented.

Audio conferences or video conferences often include many participants, with one or few of the participants actively speaking at any given time. When not speaking, the other participants typically produce noise, which may be picked up by their microphones and fed into the audio of the conference for all participants to hear. Example noises generated by conference participants may include typing on a keyboard, placing a coffee cup on a table, shuffling paper, moving chairs, shutting doors, and so on. Some of these noises have a transient characteristic that, unlike static or recurrent noise, prevent suppression through conventional noise reduction techniques. Additionally, audio energy of transient noise is typically as high, or higher, than energy levels associated with speech of the conference participants. As such, these transient noises are often fed into the conference audio as raw unsuppressed energy, resulting in noise that may disrupt the speaker and listeners, overpower the speaker's voice, trigger residual echo suppression, falsely trigger audio or video switch schemes, or the like.

Because conventional techniques of noise reduction are unable to mitigate transient noise, there are multiple negative consequences that affect conference call participants. Generally, the unsuppressed noise is let through to the other end of the call, disturbing both the speaker and other listeners. This unsuppressed noise may also, when let through to a current speaker in the call, trigger residual echo suppression that dampens the speaker's voice or affect backend speaker selection schemes such as top-3 filtering (e.g., passing through respective audio of the three call participants with the most energy). Additionally, the conference system may incorrectly prioritize noisy participants over actively speaking participants or interrupt video switching schemes by switching a video feed of the speaker to the participant generating the noise.

Some conventional techniques involve having participants that are not currently speaking manually mute their respective microphone. Muting solutions, however, are undesirable and inconvenient because these solutions result in unnatural conversational flow and often cause issues when participants forget to unmute their microphone before speaking. Manually muting microphones can be especially frustrating in a large meeting room in which many participants take turns speaking such that muting occurs very frequently. For example, anytime someone wants to speak to the other participants, that person would need to reach for a remote control or button on a device to unmute their microphone, and then remember to mute again afterwards. As such, manual muting that relies on timely manual interaction from all participants is inconvenient and often ineffective at suppressing transient noise.

Other conventional techniques also typically fail at preventing transient noise from entering the conference audio or do so at the cost of other impairments to call flow or quality. For example, some phones include noise gates that auto-mute unless there is strong energy present in an audio stream. These noise gates, however, lead to choppy quality audio and often let high-energy noise through to the conference audio. Other noise reduction techniques only work for stationary or slightly non-stationary noise (e.g., fans, traffic, background babble), not transient noise, which is sudden, non-constant, and high energy. In other cases, keyboard suppression predicts when keyboard sounds will occur and selectively suppresses these sounds. This suppression is limited to cases where the typing happens on the same laptop that is hosting the meeting, and only works for keyboard noise. Accordingly, conventional noise suppression techniques for conferences calls are unable to suppress or limit transient noise, which often interferes with call flow and quality.

This document describes apparatuses and techniques for adaptive energy limiting for transient noise suppression. As described, participants of a conference call may generate transient noise that, when allowed into the conferenced audio, often disrupts the speaker and other participants. Transient noise may also interfere with or degrade conference service processes for audio and video features, such as audio stream or video stream selection (e.g., active speaker) for presentation to other participants. Generally, aspects of adaptive energy limiting manage or control a maximum level of energy that a participant is allowed to contribute based on the participant's recent history of producing noise or speech. In various aspects, an adaptive energy limiter of a user device or conference system sets a limiter ceiling for an audio signal to full scale and receives a portion of the audio signal. For the portion of the audio signal, the adaptive energy limiter determines a maximum amplitude and evaluates the portion with a neural network to provide a voice likelihood estimate. Based on the maximum amplitude and the voice likelihood estimate, the adaptive energy limiter determines that the portion of the audio signal includes noise. In response to determining that the portion of the audio signal includes noise, the adaptive energy limiter decreases the limiter ceiling and provides the limiter ceiling to a limiter module effective to limit an amount of energy of the audio signal. By so doing, the adaptive energy limiter may prevent the audio signal from carrying full energy transient noise into conference audio or subsequent audio processes, such as speaker selection for video conferencing.

By way of example, if a participant makes noise, the ceiling of energy let through by the adaptive energy limiter will gradually be decreased. Generally, this will result in future sudden noise generated by that participant being less intrusive, and more easily ignored by other conference service algorithms, such as speaker selection for video conferencing. In some aspects, the ceiling of audio energy decreases to a minimum level after approximately 10 to 15 seconds of medium or high-energy noise, after which audio energy (e.g., noise energy) from that participant will be very limited. When that participant does start to speak, the adaptive energy limiter may reset the ceiling of audio energy to a maximum level (e.g., speech level or full scale), to let speech audio of the participant through to the other conference participants. The adaptive energy limiter does so quickly, such that the transient noise suppression provided by the adaptive energy limiter has little detrimental effect to the speech audio of the conference call. Alternately or additionally, if a participant is silent, quiet, or making low energy background noise, the adaptive energy limiter may maintain or leave the ceiling of audio energy high, as to not effect speech audio when the participant begins to speak.

Generally, aspects of adaptive energy limiting for transient noise suppression limit energy of transient noise without impairing quality of speech audio of a conference call or voice call. For example, by using long-term statistical properties of noise and/or speech in the context of audio or video conferencing scenarios, the adaptive energy limiter may substantially reduce an amount or effects of transient noise while minimally affecting speech. In other words, the adaptive noise limiter does not attempt to remove noise from concurrent noise and speech, which is otherwise a typical issue with conventional noise reduction techniques when trying to remove noise, particularly noise that may be confused with speech.

In various aspects of adaptive energy limiting, amplitude of an audio signal is measured for a time, and together with the other described utilizations of statistical properties, a limiter ceiling for audio energy is configured to prevent or suppress transient noise from entering a conference call. In some cases, a neural network is implemented to provide statistical properties about the audio signal. In accordance with various aspects, a small neural network has sufficient accuracy for such a task, such that no special acceleration hardware is needed, and speech quality does not suffer by the limits in accuracy of the neural network or associated voice activity detector (VAD). Alternately or additionally, an adaptive energy manager may be implemented to adjust or manage gain or sub-band gain of an audio signal based on the audio signal evaluations described herein.

As such, various aspects of energy limiting (or energy management) may be implemented to limit or reduce an amount of energy an audio signal is able to carry into a conference service, through a conference call, or out to conference call participants. In other words, for each participant, an adaptive energy limiter may track a noise debt that builds up as a participant continues to make noise. As the noise debt builds (or energy limit decreases), the adaptive energy limiter prevents or disallows that participant from sending a lot of energy into a call until that participant proves that they're sending speech (e.g., by sending a statistically significant amount of speech audio). The adaptive energy limiter may also effectively suppress transient noise by using (e.g., via the neural network) statistical energy differences of transient noises (e.g., high energy), vowels (e.g., medium energy) and consonants (e.g., low energy) to allow speech (e.g., consonants) to pass through perceptually unaffected even when transient noises are reduced 20 dB or more. Aspects of adaptive energy limiting may achieve such an effect through use of the limiter ceiling of audio signal energy and/or through management of sub-band gains used to process the audio signals of participants.

While any number of different environments, systems, devices, and/or various configurations can implement features and concepts of the described techniques and apparatuses for adaptive energy limiting for transient noise suppression, aspects of adaptive energy limiting for transient noise suppression are described in the context of the following example environment, devices, configuration, methods, and system.

Example Environments

FIG. 1 illustrates an example environment 100 in which various aspects of adaptive energy limiting for transient noise suppression can be implemented. In the example environment 100, user devices 102 may communicate audio and/or video through a conference system 104 in which access to the system is provided by a conference service 106 (e.g., cloud-based meeting or conference service). User devices 102 in this example include a smartphone 102-1, laptop computer 102-2, tablet computer 102-3, smartwatch 102-4, telephone 102-5, conference bridge 102-6, and video conference display 102-7. Although illustrated as devices, a user device may be implemented as any suitable computing or electronic device, such as a mobile communication device, a computing device, a client device, an entertainment device, a gaming device, a mobile gaming console, a personal media device, a media playback device, a charging station, an Advanced Driver Assistance System (ADAS), a point-of-sale (POS) transaction system, a health monitoring device, a drone, a camera, a wearable smart-device, a navigation device, a mobile-internet device (MID), an Internet home appliance capable of wireless Internet access and browsing, an Internet-of-Things (IoT) device, a Fifth Generation New Radio (5G NR) user equipment, and/or other types of user devices.

Generally, a respective user of a user device 102 may interact with other users through audio and/or video data exchanged through a data or voice connection to the conference service 106. In some aspects, each user device 102 participating in an instance of a conference call facilitated by the conference service 106 provides an audio signal 108 and/or video signal through a respective connection with the conference service. For example, any or all of the user devices 102 may provide a channel of audio signals 108 (or audio data) that corresponds to audio captured by a microphone of that device. During a conference call, participants typically take turns speaking while other inactive or non-speaking participants listen or watch. Some of the participants, however, may choose to move a chair, write an e-mail, or take notes on a computer. Such moving and typing activities may generate transient noise, which may include a sound or sound wave with a short, pulse-like signal characteristic. Other potential sources of transient noise may include clicking noise from a computer mouse, moving items on a table or work surface, doors closing, phone keypad or ring tones, or the like. For example, if two participants, each at a respective endpoint of a conference or voice call are situated proximate each other in an open-plan office, one of the participants using a smartphone 102-1 and the other using a laptop computer 102-2, potential transient noise may be generated at both endpoints when the participant using the laptop computer 102-2 starts typing.

In aspects of adaptive energy limiting for transient noise suppression, the conference service 106 includes an instance of an adaptive energy limiter 110 (adaptive limiter 110), which may limit or manage energy of an audio signal to suppress various forms of transient noise. Although illustrated with reference to the conference service 106, any or all of the user devices 102 may also include an instance of the adaptive energy limiter 110. Thus, an adaptive energy limiter 110 may limit or manage energy of an audio signal sent to the conference service 106, processed by the conference service 106, or sent by the conference service to other user devices 102. The adaptive energy limiter 110 is associated with or has access to a neural network 112, which may be implemented as a recurrent neural network (RNN). In this example, the neural network 112 includes a voice activity detector 114 (VAD 114) that may be configured to provide indications of voice likelihood for audio signals or frames of audio. For example, the adaptive energy limiter 110 may use the voice activity detector 114 to obtain an indication of voice likelihood for a frame of audio. Such an indication may be useful to determine whether the audio signal or frame of audio is more likely speech or noise. Alternately or additionally, the voice activity detector 114 can be implemented as a neural network-enabled voice activity detector that uses a neural network to determine or provide a voice likelihood measurement for a sample of audio signal or audio frame.

Figure 2:
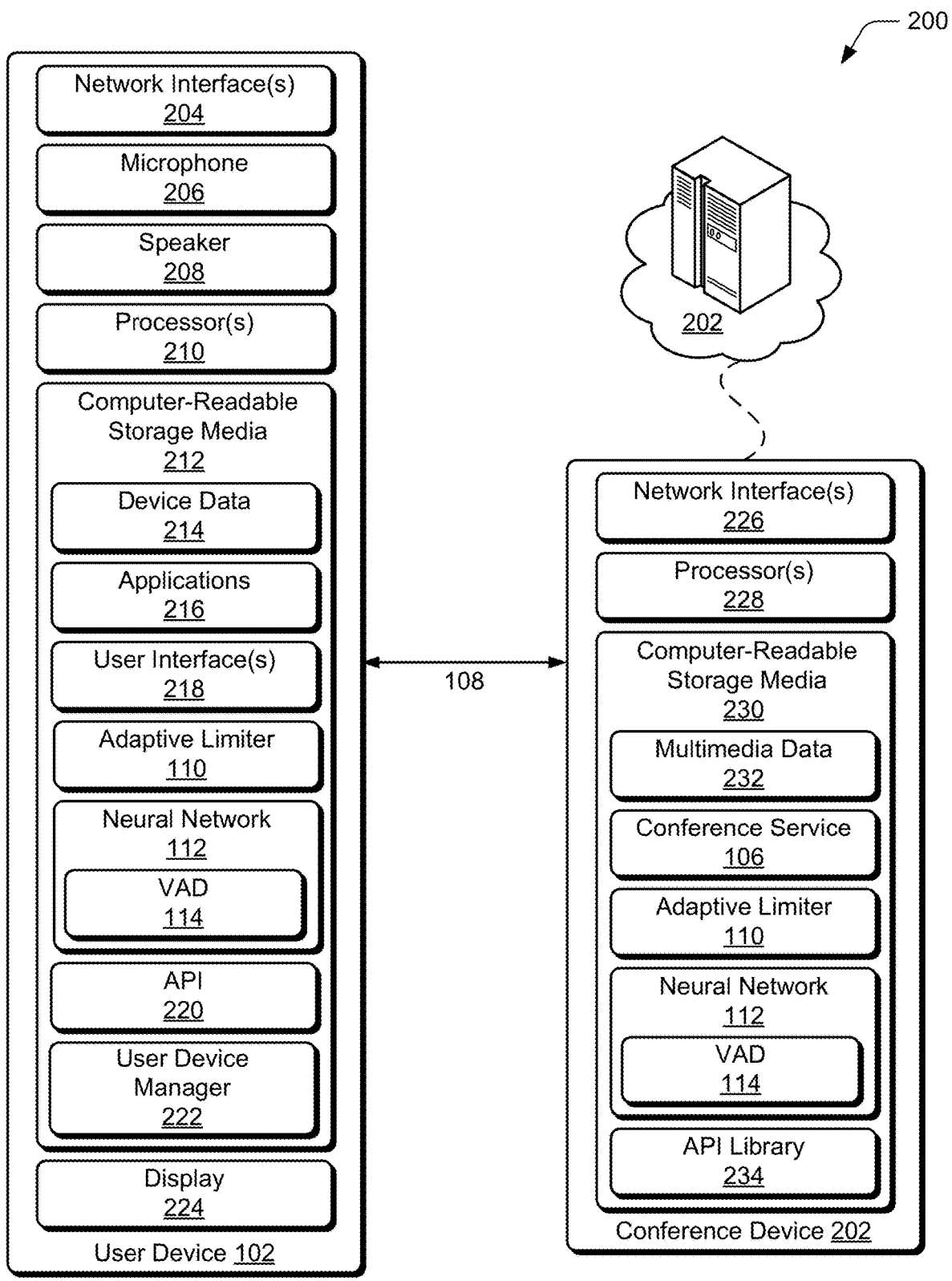
FIG. 2 illustrates example device diagrams of a user device and a conference device that include respective instances of an adaptive energy limiter in accordance with one or more aspects.

FIG. 2 illustrates at 200 example device diagrams of a user device 102 and a conference device 202, which may provide the conference service 106. Although each device is shown with an instance of an adaptive energy limiter, aspects of adaptive energy limiting may be implemented on one device, both devices, or in coordination between devices. For example, an adaptive energy limiter 110 of a user device 102 may interact with adaptive energy limiter 110 or neural network 112 of the conference device 202 to set a limiter ceiling value at the user device 102. Shown in exemplary configurations, the user device 102 or the conference device 202 may also include additional functions, components, or interfaces omitted from FIG. 2 for the sake of clarity or visual brevity. Alternately or additionally, any respective components of the user device 102 or the conference device 202 may be implemented in whole or part as hardware logic or circuitry integrated with or separate from other components.

In this example, the user device 102 includes network interfaces 204 for exchanging data, such as audio signals or video streams, over various types of networks or communication protocols. Generally, the network interfaces 204 can be implemented as any one or more of a serial and/or parallel interface, a wireless interface, a wired interface, or a modem for transmitting or receiving data or signals. In some cases, the network interfaces 204 provide a connection and/or communication link between the user device 102 and a communication network by which other user devices 102, and the conference device 202, communicate audio signals 108, video data, or the like for conferenced media communication. The user device 102 also includes at least one microphone 206 to capture audio (e.g., speech, sound, or noise) from an environment of the user device 102 and at least one speaker 208 to generate audio or sound based on audio data of the user device 102. In some aspects, the microphone captures audio generated by a user, such as speech, and provides an audio signal to audio circuitry (not shown) of the user device 102 for encoding or other signal-processing.

The user device 102 also includes processor(s) 210 and computer-readable storage media 212 (CRM 212). The processor(s) 210 may be a single core processor or a multiple core processor composed of a variety of materials, such as silicon, polysilicon, high-K dielectric, or the like. The computer-readable storage media 212 is configured as storage, and thus does not include transitory signals or carrier waves. The CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user device 102.

The device data 214 may include user data, multimedia data (e.g., audio data or video data), applications 216 (e.g., media conference client application), user interface(s) 218, and/or an operating system of the user device 102, which are accessible to or executable by processor(s) 210 to enable audio or video conferencing and/or other user interaction with the user device 102. The user interface 218 can be configured to receive inputs from a user of the user device 102, such as to receive input from a user that may define and/or facilitate one or more aspects of adaptive energy limiting for transient noise suppression. The user interface 218 can include a graphical user interface (GUI) that receives the input information via a touch input. In other instances, the user interface 218 includes an intelligent assistant that receives the input information via an audible input. Alternately or additionally, the operating system of the user device 102 may be maintained as firmware or an application on the CRM 212 and executed by the processor(s) 210.

The CRM 212 also includes an adaptive energy limiter 110, neural network 112, and voice activity detector 114. In various aspects, the adaptive energy limiter 110 utilizes the neural network 112 and/or voice activity detector 114 (VAD 114) to determine whether an audio signal comprises speech or noise. Based on this determination, the adaptive energy limiter 110 may decrease a limiter ceiling to limit energy of noise that would otherwise disrupt a conference call or voice call if allowed to pass through at full energy. The implementations and uses of the adaptive energy limiter 110, neural network 112, and/or voice activity detector 114 vary and are described throughout the disclosure.

Aspects and functionalities of the user device 102 may be managed via operating system controls presented through at least one application programming interface 220 (API 220). In some aspects, the adaptive energy limiter 110 or an application of the user device 102 accesses an API 220 or an API service of the user device 102 to control aspects and functionalities of audio or video conference applications. For example, the adaptive energy limiter 110 may access low-level audio processor settings of the user device 102 to implement aspects of adaptive energy limiting, such as to set a minimum limiter ceiling level, adjust audio gain setting, manage respective signal levels of incoming and outgoing audio signals, or the like. The CRM 212 of the user device 102 may also include a user device manager 222, which can be implemented in whole or part as hardware logic or circuitry integrated with or separate from other components of the user device 102. In at least some aspects, the user device manager 222 configures the microphone 206 and other audio circuitry of the user device 102 to implement the techniques for transient noise suppression as described herein.

The user device 102 also includes a display 224 for displaying and/or providing information or a video feed to a user. For example, through the display 224, the user device 102 may provide the user with a video feed from a video conference enabled by the conference service 106. Alternately or additionally, the user device 102 may also include a camera (not shown) to enable generation of a video feed from the user device 102 for multimedia conferencing.

The conference device 202 may be implemented as a computing device, server, cloud-based hardware, or other resources through which the conference service 106 is provided to the user devices 102. Generally, the conference device 202 may serve as a collector and/or arbiter of multimedia data or streams for an instance of a conference call. As such, the conference device 202 may implement aspects of adaptive energy limiting with respect to inbound audio data received from user devices 102, internal multimedia processing operations, or outbound audio data transmitted to the user devices 102 as part of a conference or voice call.

In this example, the conference device 202 includes network interfaces 226 for exchanging data, such as audio signals or video streams, over various types of networks or communication protocols. Generally, the network interfaces 226 can be implemented as any one or more of a serial and/or parallel interface, a wireless interface, a wired interface, or a modem for transmitting or receiving data or signals. In some cases, the network interfaces 226 provide a connection and/or communication link between the conference device 202 and a communication network by which the user devices 102 communicate audio signals 108, video data, or the like to for conferenced media communication.

In this example, the conference device 202 also includes processor(s) 228, or compute resources, and computer-readable storage media 230 (CRM 230). The computer-readable storage media 230 is configured as storage, and thus does not include transitory signals or carrier waves. The CRM 230 may include any suitable memory or storage device such as RAM, SRAM, DRAM, NVRAM, ROM, or Flash memory useable to store multimedia data 232 of the conference device 202.

The multimedia data 232 of the conference device 202 may include audio data, audio signals, or video data useful to facilitate conference calls through an instance of the conference service 106. The multimedia data 232 and conference service 106, as well as other applications (e.g., media conference server applications) and/or an operating system of the conference device 202 may be accessible to or executable by processor(s) 228 to enable audio or video conferencing for multiple user devices 102.

In this example, the CRM 230 also includes an instance of the adaptive energy limiter 110, neural network 112, and voice activity detector 114. As noted, aspects of adaptive energy limiting may be implemented by a user device 102, conference device 202, or a combination of both devices. In various aspects, the adaptive energy limiter 110 utilizes the neural network 112 and/or voice activity detector 114 to determine whether one or more audio signals comprise speech or noise. Based on this determination, the adaptive energy limiter 110 of the conference device 202 may decrease a limiter ceiling for a respective audio signal or audio feed to limit energy of noise that would otherwise disrupt a conference call or voice call if allowed to pass through at full energy. The implementations and uses of the adaptive energy limiter 110, neural network 112, and/or voice activity detector 114 vary and are described throughout the disclosure.

Aspects and functionalities of the conference device 202 may be managed via system controls presented through at least one application programming interface (API) of an API library 234. In some aspects, the adaptive energy limiter 110 or an application of the conference device 202 accesses an API or library of the API library 234 to implement aspects of transient noise limiting. For example, the adaptive energy limiter 110 may be implemented as part of or in conjunction with a web-based real-time communications library.

Figure 3:
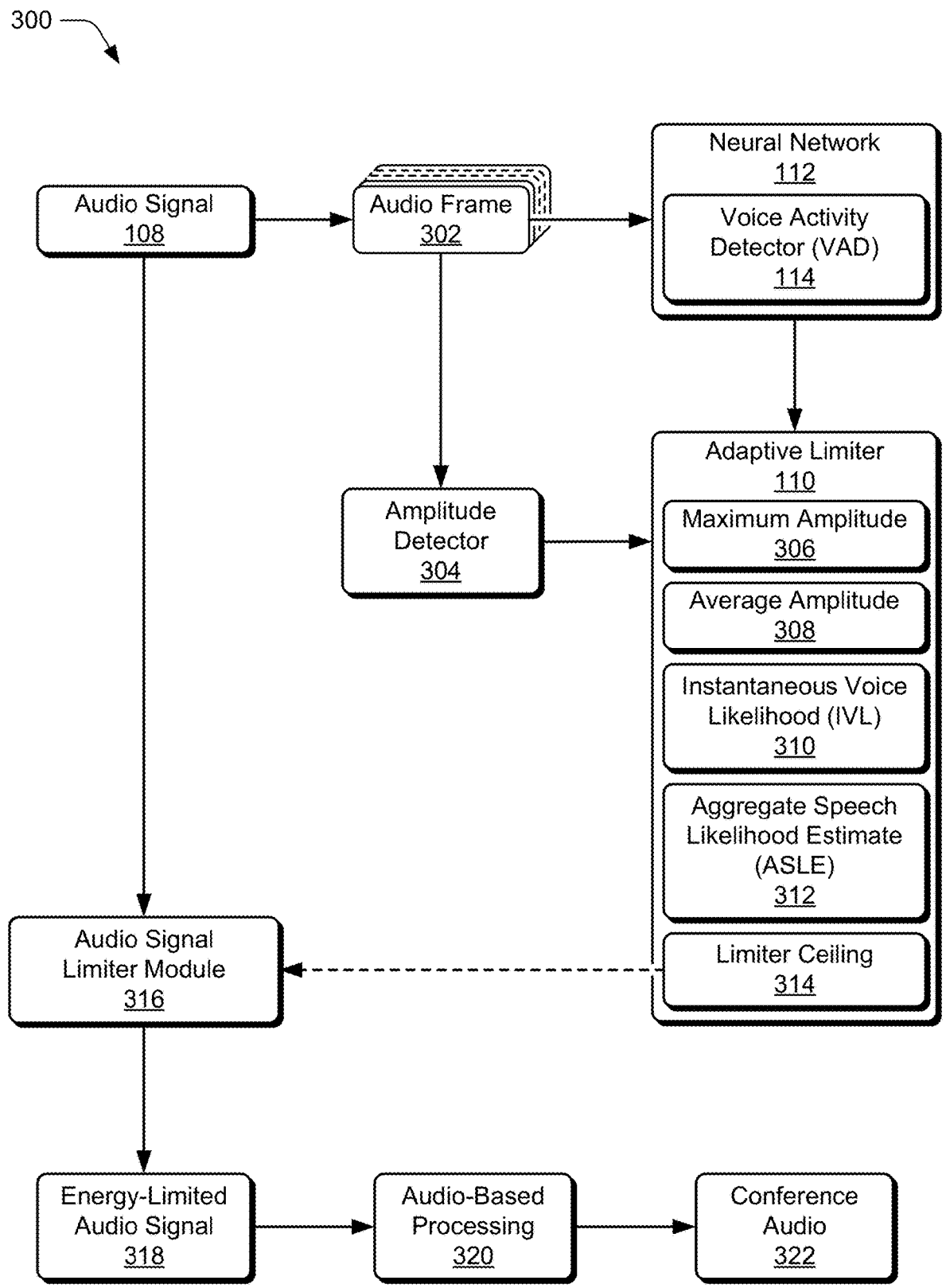
FIG. 3 illustrates an example configuration of components that are capable of implementing various aspects of adaptive energy limiting.

FIG. 3 illustrates at 300 an example configuration of components that are capable of implementing various aspects of adaptive energy limiting. Generally, the components of FIG. 3 may be embodied on a user device 102, a conference device 202, or a combination thereof. In some aspects, the components shown at 300 are implemented as an integrated component (e.g., system-on-chip) of one device and/or in combination with a memory storing processor-executable instructions to provide respective functionalities of one or more components. As such, the configuration of components shown in FIG. 3 is non-limiting and may be implemented on any suitable device, combination of devices, and/or as hardware (e.g., logic circuitry) combined with firmware or software to provide the described functionalities.

In some aspects, an audio signal 108 is sliced or partitioned into audio frames 302 that correspond to respective portions of the audio signal. For example, each of the audio frames 302 may correspond to a portion, segment, or duration of audio (e.g., speech and/or noise) of the audio signal 108. In some cases, an audio frame 302 or frame of audio corresponds to a range of approximately five milliseconds to 50 milliseconds of audio (e.g., 10 millisecond of audio). Alternately or additionally, the audio frames 302 may be converted from a time domain to a frequency domain, such as to enable spectral analysis or other frequency domain-based processing.

As shown in FIG. 3, the example components include an amplitude detector 304 and a neural network 112, which includes or provides a voice activity detector 114 for processing the audio frames 302. Generally, the amplitude detector 304 measures or determines an amplitude of the audio signal 108 that corresponds to an audio frame. For example, the amplitude detector 304 may generate or provide an indication of a maximum amplitude 306 for a frame of audio or portion of audio signal. In some aspects, the adaptive energy limiter 110 determines or updates an average amplitude 308 (e.g., moving average) for the audio signal 108 or audio frames 302 based on multiple maximum amplitudes 306.

The neural network 112 may be implemented as a network that operates on a processor of a user device 102 to provide voice likelihood estimates for the audio frames 302. Alternately or additionally, the neural network 112 may be implemented as a recurrent neural network (RNN) or machine-learned model with a memory (e.g., RNNoise). In some aspects, the voice activity detector 114 provides, for one or more of the audio frames, an instantaneous voice likelihood 310 (IVL 310). Although described as a neural network-enabled voice activity detector, other types of voice activity detection or voice classification may be used.

For example, the neural network 112 and/or voice activity detector 114 may be implemented as a neural network (e.g., deep neural network (DNN)) comprising an input layer, an output layer, and one or more hidden intermediate layers positioned between the input layer and the output layer of the neural network. Any or all nodes of the neural network may be in turn fully connected or partially connected between the layers of the neural network. A voice activity detector 114 may be implemented with or through any type of neural network, such as a convolutional neural network (CNN) including GoogleNet or similar convolutional networks. Alternately or additionally, a voice activity detector 114 or machine-learned voice activity detection model may include any suitable recurrent neural network (RNN) or any variation thereof. Generally, the neural network 112 and/or voice activity detector 114 employed by the adaptive energy limiter may also include any other supervised learning, unsupervised learning, reinforcement learning algorithm, or the like.

In various aspects, a neural network 112 and/or voice activity detector 114 associated with the adaptive energy limiter 110 may be implemented as a recurrent neural network (RNN) with connections between nodes that form a cycle to retain information from a previous portion of an input data sequence for a subsequent portion of the input data sequence (e.g., previous audio frames of speech or noise generated by a participant). In other cases, a neural network 112 is implemented as a feed-forward neural network having connections between the nodes that do not form a cycle between input data sequences. Alternately, a neural network 112 may be implemented as a convolutional neural network (CNN) with multilayer perceptrons where each neuron in a particular layer is connected with all neurons of an adjacent layer. In various aspects of adaptive energy limiting, the neural network 112 and/or voice activity detector 114 may use previous determinations of noise or speech by a participant to predict or determine whether subsequent frames of an audio signal include speech or noise that may be suppressed.

Generally, the neural network 112 may enable the determination of voice likelihood estimations that quickly converge to high statistical confidence, particularly in the presence of vowel sounds. By way of review, transient noise often has more full-band energy than vowels, and even more so than consonants in speech. Thus, in utilizing a statistical confidence provided by the neural network 112, the adaptive energy limiter is able to leverage historical noise or speech patterns of a participant to distinguish between noise, vowels, and consonants of speech. In other words, speech and noise tend to come in bursts, that is, a participant that has recently spoken is more likely to continue speaking in the near future (e.g., sub-second). Alternately, a participant that produced noise in the recent past is more likely to generate additional noise in the future. In some cases, any lag introduced by the adaptive energy limiter is imperceptible to conference call participants, yet the neural network 112 is able to more accurately determine in retrospect (e.g., a few 100 milliseconds) whether audio of the frame or signal is noise or speech, than to such in real-time.

Based on one or more of the instantaneous voice likelihoods 310, the adaptive energy limiter 110 may determine an aggregate speech likelihood estimate 312 (ASLE 312) for the audio signal 108 or audio 302. The aggregate speech likelihood estimate 312 may be configured or updated based on a current aggregate speech likelihood estimate 312 and/or a threshold for detection of voice or noise. For example, in some cases, the adaptive energy limiter 110 increases the aggregate speech likelihood estimate 312 in response to an instantaneous voice likelihood 310 exceeding the current aggregate speech likelihood estimate 312, as well as exceeding a threshold for voice detection. In other cases, the adaptive energy limiter 110 may decrease the aggregate speech likelihood estimate 312 in response to an instantaneous voice likelihood 310 not exceeding the current aggregate speech likelihood estimate 312 or not exceeding a threshold for voice detection.

The adaptive energy limiter 110 also includes or provides a limiter ceiling 314 by which energy of the audio signal 108 may be limited, such as to suppress energy of transient noise. Generally, the limiter ceiling 314 is provided to an audio signal limiter module 316 through which the audio signal 108 passes before transmission to other audio components or processes. The audio signal limiter module 316 may pass audio signal through at full scale (e.g., unreduced or not limited) or a reduced scale or reduced amplitude as specified by the limiter ceiling 314 set by the adaptive energy limiter 110. In the context of FIG. 3, based on the limiter ceiling 314 provided by the adaptive energy limiter 110, the audio signal limiter module 316 limits or decreases energy of the audio signal 108 to provide or generate an energy-limited audio signal 318. In various aspects, the adaptive energy limiter 110 limits the energy of an audio signal determined to be, or include, noise in order to suppress the noise and likely future noise. The energy-limited audio signal 318 may then be transmitted to audio-based processing 320 for subsequent processing or use for other features (e.g., speaker selection), before being included in conference audio 322, which is shared with other participants of an audio or video conference call.

Example Methods

Figure 4:
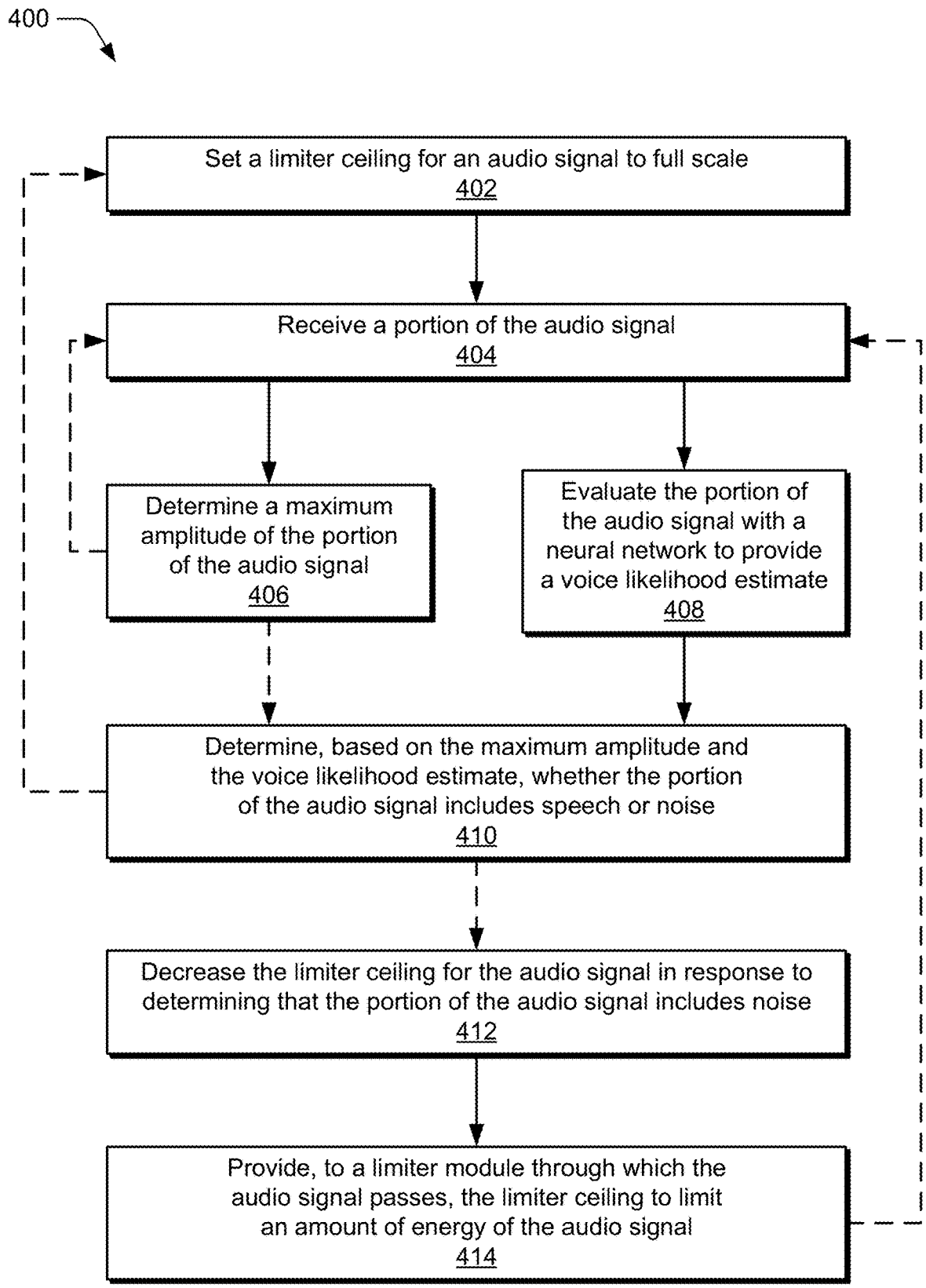
FIG. 4 illustrates an example method for adaptively limiting energy of an audio signal in accordance with one or more aspects.

Example methods 400 and 500 are described with reference to FIG. 4, FIG. 5A, and FIG. 5B in accordance with one or more aspects of adaptive energy limiting for transient noise suppression. Generally, methods 400 and 500 illustrate sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to example conference environment 100 of FIG. 1, example devices of FIG. 2, example components of FIG. 4, example systems of FIG. 7, and/or entities detailed in FIG. 1, reference to which is made for example only. The techniques and apparatuses described in this disclosure are not limited to embodiment or performance by one entity or multiple entities operating on one device.

Method 400 is a method performed by a user device 102 or conference device 202. The method 400 limits an amount of energy of an audio signal to mitigate effects associated with transient noise in conference environments or other audio processes (e.g., speaker selection for video conferencing). In some aspects, operations of the method 400 are implemented by or with an adaptive limiter 110, neural network 112, and/or voice activity detector 114 of the user device 102 or conference device 202.

At 402, a limiter ceiling for an audio signal is set to full scale. In some cases, the limiter ceiling or limiting value is set to full scale on initialization of the adaptive energy limiter or in response to speech by a participant for which an audio signal is being processed for noise suppression.

At 404, a portion of the audio signal is received. The portion of the audio signal may include a frame of audio, audio frame, segment of the audio signal, or the like. In some cases, the audio signal is received and separated into frames of audio for analysis by the adaptive energy limiter. For example, a frame of the audio may correspond to a range of approximately five milliseconds to 50 milliseconds of audio. Alternately or additionally, the frame of audio can be converted from a time domain to a frequency domain to enable spectral analysis or other frequency domain-based processing.

At 406, a maximum amplitude of the portion of the audio signal is determined. The maximum amplitude may be determined for the portion of audio signal that corresponds to a frame of audio or a duration of audio (e.g., 10 milliseconds). In some cases, the maximum amplitude of the audio signal is compared to a threshold to determine if a participant is silent, quiet, or otherwise not generating noise. Optionally, from operation 406, the method 400 may return to operation 404 if the audio signal is quiet or silent. By so doing, energy of the silent participant's speech will not be reduced if and when the participant begins to speak.

At 408, the portion of the audio signal is evaluated with a neural network to provide a voice likelihood estimate. In some aspects, the portion of the audio signal or a frame of audio is evaluated with the neural network or a neural network-enabled voice activity detector to provide an instantaneous voice likelihood for the portion of the audio signal or the audio frame. Generally, the instantaneous voice likelihood may indicate if the audio stream is more likely speech or more likely noise, which the adaptive energy limiter would suppress.

At 410, a determination is made, based on the maximum amplitude and the voice likelihood estimate, as to whether the portion of the audio signal includes speech or noise. For example, if the maximum amplitude of the portion of the audio signal exceeds a moving average of the maximum amplitude (e.g., maximum average plus a small modifier) and the instantaneous voice likelihood is less than 0.5 or 50% (indicating noise), it may be determined that the portion of audio includes or is noise. Alternately, if the maximum amplitude of the portion of the audio signal does not exceed the moving average of the maximum amplitude (e.g., maximum average plus a small modifier) or the instantaneous voice likelihood is greater than 0.5 or 50%, it may be determined that the portion of audio is not noise or is speech (e.g., maximum average exceeded and IVL greater than 50%). Optionally, from operation 410, the method 400 may return to operation 402 if it is determined that the portion of the audio signal is or includes speech of the participant.

At 412, the limiter ceiling for the audio signal is decreased in response to determining that the portion of the audio signal includes noise. In some aspects, the limiter ceiling is decreased by a specific rate or amount based on an aggregate speech likelihood estimate. For example, if the aggregate speech likelihood estimate is high, the ceiling limit is decreased by a small amount or slowly toward a minimum limiter ceiling value. In other cases, when the aggregate speech likelihood estimate is low, the ceiling limit may be decreased by a large amount or quickly toward the minimum limiter ceiling value. Alternately or additionally, the minimum limiter ceiling can be configured based on the aggregate speech likelihood estimate, an average of respective amplitudes of multiple portions of the audio signal, or an average of respective maximum amplitudes of multiple portions of the audio signal, such as to represent a portion of current energy estimated to be speech.

At 414, the limiter ceiling is provided to a limiter module through which the audio signal passes. The limiter module limits, based on the limiter ceiling, the amount of energy of the audio signal. By limiting the energy that the audio signal is allowed to transmit or carry into a conferenced audio environment, aspects of adaptive energy limiting may prevent full energy transient noise from entering the conference audio and disrupting participants and/or other audio-based processes.

Figure 5A:
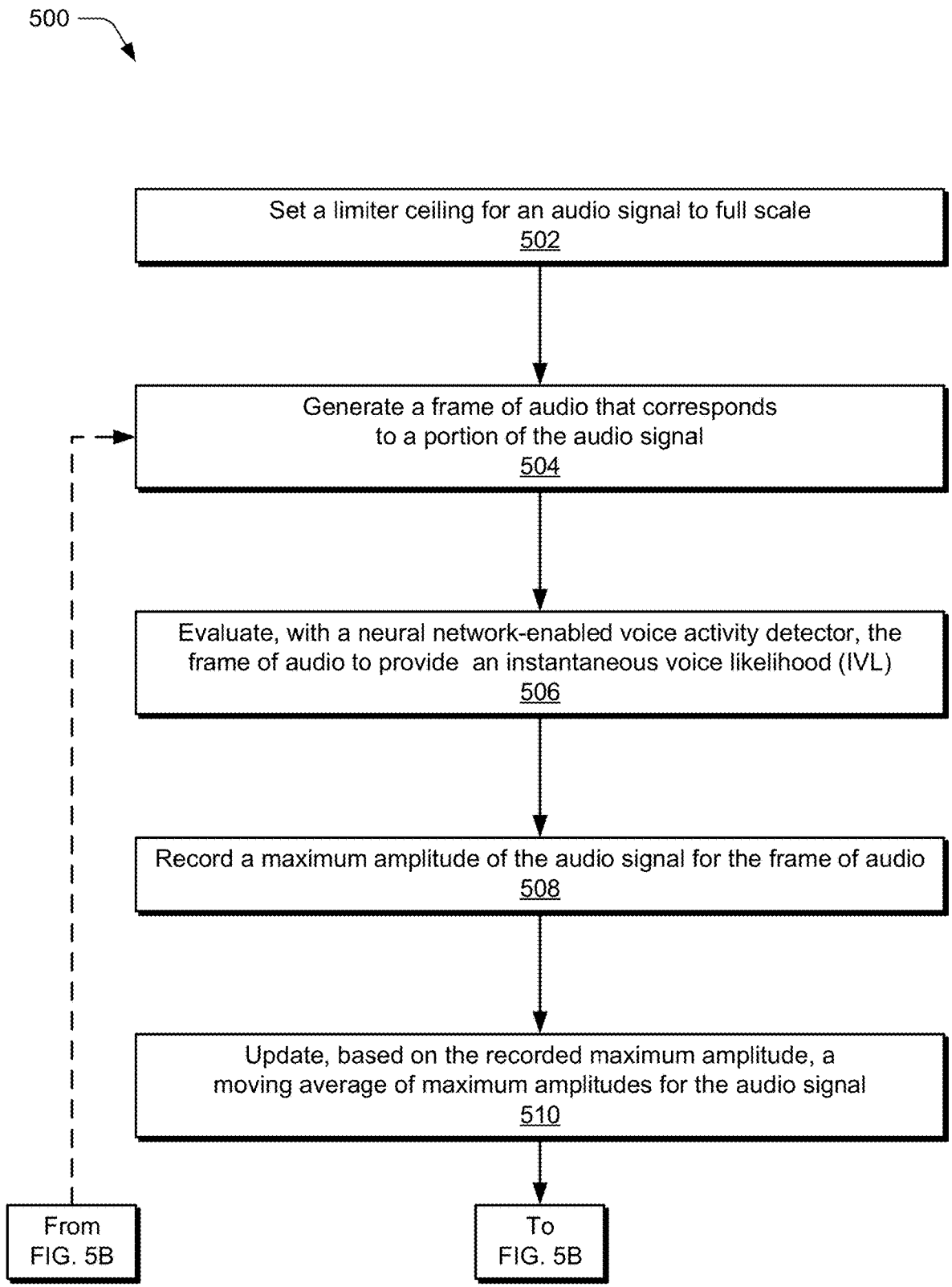

Method 500 of FIGS. 5A and 5B is a method performed by a user device 102 or a conference device 202. The method 500 scales an audio signal to not exceed a limiter ceiling, which may be effective to prevent the audio signal from carrying full energy transient noise into a conferenced audio environment. In some aspects, operations of the method 500 are implemented by or with an adaptive limiter 110, neural network 112, and/or voice activity detector 114 of the user device 102 or conference device 202.

At 502, a limiter ceiling for an audio signal is set to full scale (e.g., 1.0 or 100%). The limiter ceiling or limiting value may be set to full scale on initialization of the adaptive energy limiter or reset to full scale in response to speech by a participant for which an audio signal is being processed for noise suppression.

At 504, a frame of audio is generated that corresponds to a portion of the audio signal. In some cases, the audio signal is received and/or separated, sliced, or otherwise partitioned into frames of audio for analysis by the voice activity detector and/or adaptive energy limiter. In other cases, the audio frame may be received from an audio codec or other entity configured to provide frames from the audio signal. For example, a frame of the audio may correspond to a range of approximately five milliseconds to 50 milliseconds of audio (e.g., 10 milliseconds). Alternately or additionally, the frame of audio can be converted from a time domain to a frequency domain to enable spectral analysis or other frequency domain-based processing.

At 506, the frame of audio is evaluated with a neural network-enabled voice activity detector to provide an instantaneous voice likelihood (IVL). In some aspects, the portion of the audio signal or a frame of audio is evaluated with the neural network or a neural network-enabled voice activity detector to provide an instantaneous voice likelihood for the portion of the audio signal or the audio frame. Generally, the instantaneous voice likelihood may indicate if the audio stream is more likely speech or more likely noise, which the adaptive energy limiter would suppress.

At 508, a maximum amplitude of the audio signal is recorded from the frame of audio. The maximum amplitude may be determined or recorded for a duration of audio signal that corresponds to a frame of audio or a duration of audio (e.g., 10 milliseconds). In some cases, the maximum amplitude of the audio signal is compared to a threshold to determine if a participant is silent, quiet, or otherwise not generating noise. In such cases, the method 500 may return to operation 504 if the audio signal is quiet or silent.

At 510, a moving average of maximum amplitudes for the audio signal is updated based on the recorded maximum amplitude for the frame of audio. The moving average of maximum amplitudes may correspond to any suitable number of audio frames or duration of audio, such as a range of approximately 100 milliseconds to 500 milliseconds.

As shown at 512 in FIG. 5B, operation 514 determines an aggregate speech likelihood estimate (ASLE) based on the instantaneous voice likelihood (IVL) of the frame of audio. The aggregate speech likelihood estimate may be determined or configured based on a current aggregate speech likelihood estimate and/or a threshold for detection of voice (or noise). In some cases, the aggregate speech likelihood estimate is increased in response to an instantaneous voice likelihood that exceeds the current aggregate speech likelihood estimate and the threshold for voice detection. In other cases, the aggregate speech likelihood estimate is decreased in response to an instantaneous voice likelihood that does not exceed the current aggregate speech likelihood estimate or the threshold for voice detection.

At 516, a determination is made as to whether the maximum amplitude exceeds the moving average and the instantaneous voice likelihood indicates the frame of audio is noise. For example, if the maximum amplitude of the portion of the audio signal exceeds the moving average of the maximum amplitude (e.g., maximum average plus a small modifier) and the instantaneous voice likelihood is less than 0.5 or 50% (indicating noise), the audio frame may include or be noise. Alternately, if the maximum amplitude of the portion of the audio signal does not exceed the moving average of the maximum amplitude (e.g., maximum average plus a small modifier) or the instantaneous voice likelihood is greater than 0.5 or 50%, the audio frame may not include or be predominately noise.

Optionally at 518, the limiter ceiling is not decreased in response to the maximum amplitude not exceeding the moving average and/or the instantaneous voice likelihood not indicating that the frame of audio is noise. Optionally at 520, the limiter ceiling is decreased based on the aggregate speech likelihood estimate (ASLE). The limiter ceiling is decreased in response to the maximum amplitude exceeding the moving average and the IVL indicating that the frame of audio is noise. Generally, an amount by which or a rate at which the limiter ceiling is decreased is determined based on the aggregate speech likelihood estimate.

At 522, a current value of the limiter ceiling is provided to a limiter module to scale the audio signal to not exceed the current value. The limiter module scales, based on the limiter ceiling, the amount of energy of the audio signal that passes through the limiter module. By scaling or limiting the energy that the audio signal is allowed to transmit or carry into a conferenced audio environment, aspects of adaptive energy limiting may prevent full energy transient noise from entering the conference audio and disrupting participants and/or other audio-based processes. From operation 522, the method 500 may return to operation 504 to perform another iteration of the method 500 to further limit energy of the audio signal, reset the limiter ceiling, or maintain a current limiter ceiling. In some aspects, the method 500 or process for adaptive energy limiting is iterated or repeated approximately every five milliseconds to 50 milliseconds (e.g., 10 milliseconds) to provide responsive suppression of transient noise.

Figure 6:
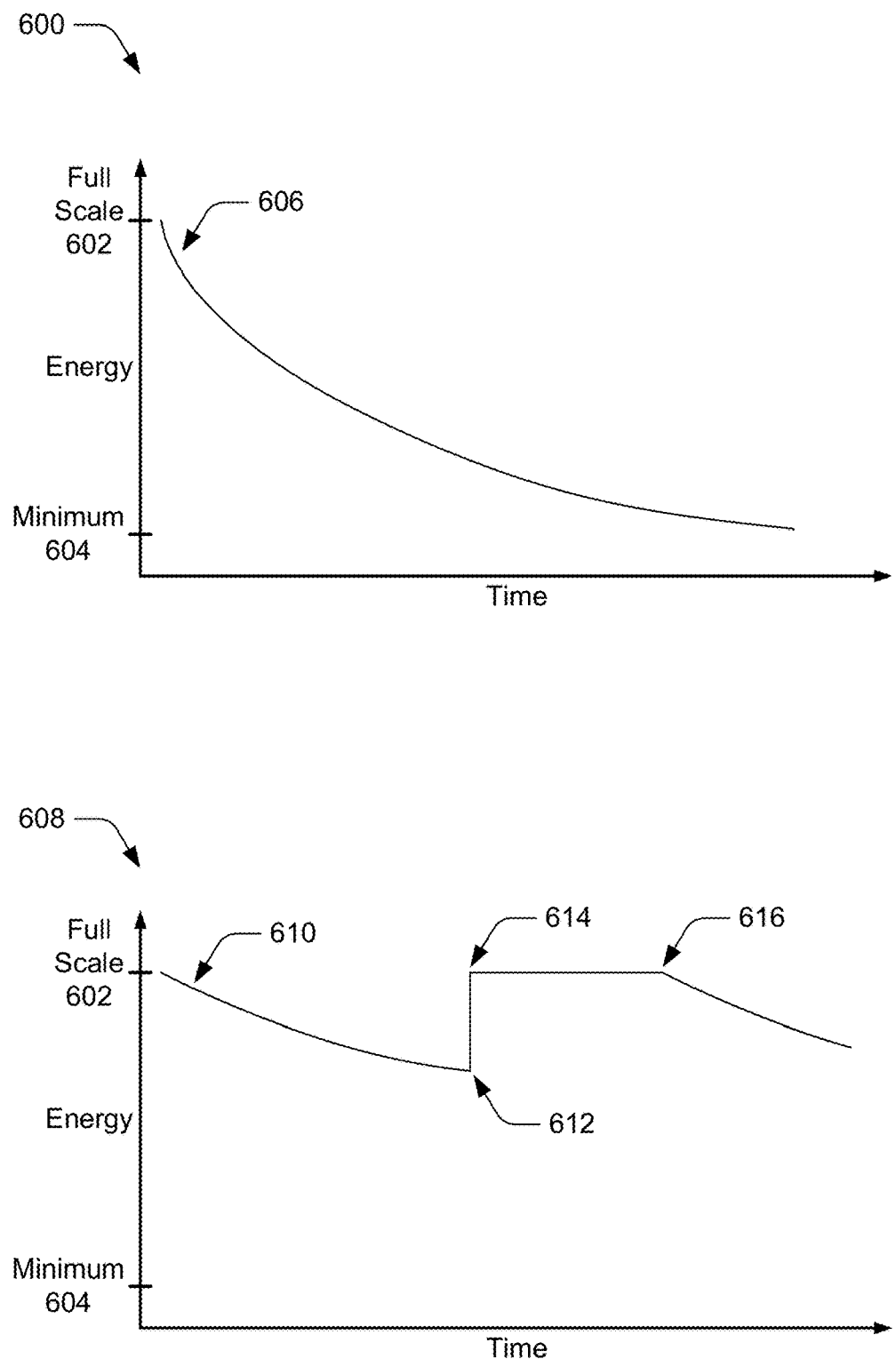
FIG. 6 illustrates example graphs in which energy of an audio signal is limiting in accordance with one or more aspects.

By way of example, consider FIG. 6 in which a graph 600 illustrates aspects of adaptive energy limiting. In the context of a limiter module, energy of an audio signal is passed at full scale 602 or limited to a minimum 604 of the limiter ceiling. In this example, assume the audio signal 606 is received from a participant that is constantly generating noise at a medium to high level (without speech). Here, the adaptive energy limiter 110 may quickly limit the energy of the audio signal that passes to the conference audio environment to prevent the noise of audio signal 606 from disrupting other participants of the conference call.

As another example, consider graph 608, which includes an audio signal 610 of another participant of the conference call. Here, assume that the participant is not speaking, but also not making much noise. The adaptive energy limiter 110 gradually limits the audio signal 610 until the participant begins speaking at 612. In response to detecting speech, the adaptive energy limiter 110 resets the limiter ceiling to full scale 602 at 614 and does not begin to limit energy of the audio signal 610 until the participant ceases to speak at 616.

Systems

Figure 7:
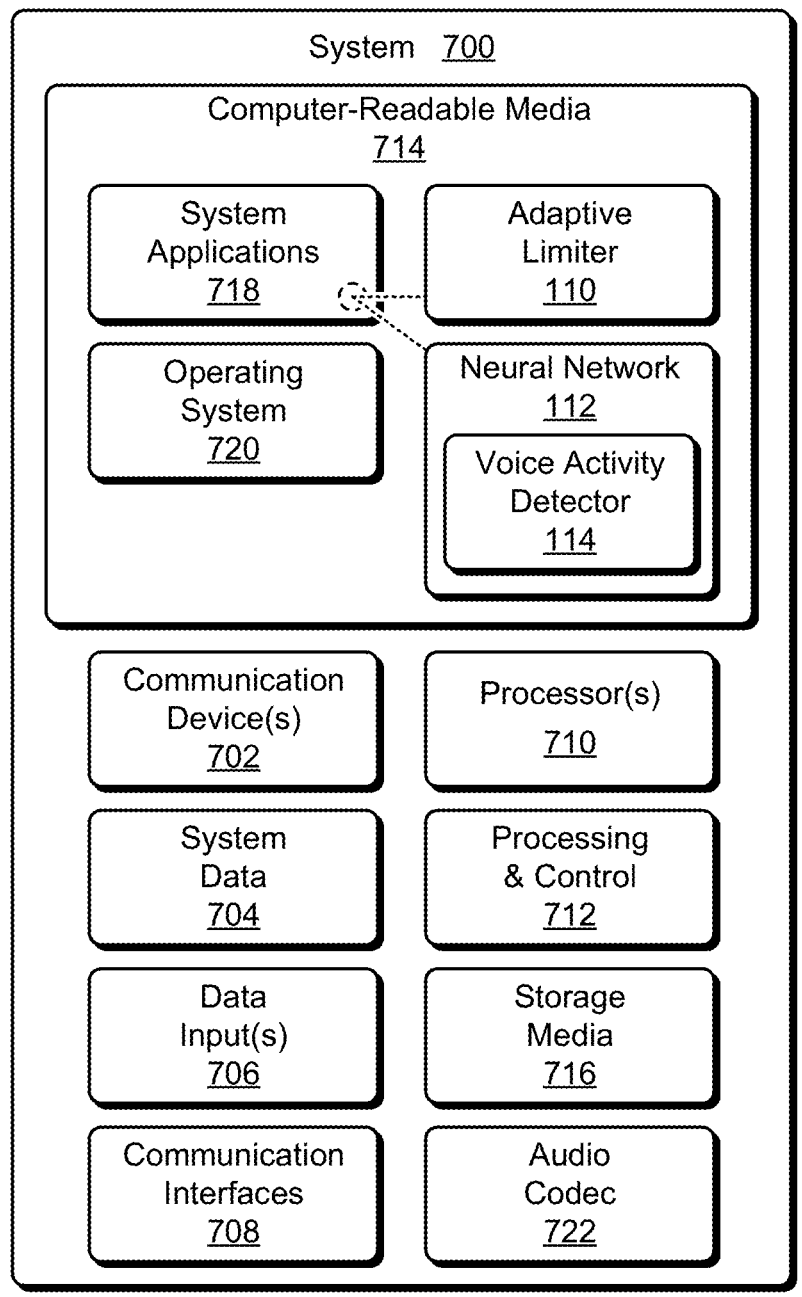
FIG. 7 illustrates a system diagram of components for implementing adaptive energy limiting for transient noise suppression in accordance with one or more aspects.

FIG. 7 illustrates various components of an example system 700 that can be implemented as any type of user device 102 or conference device 202 as described with reference to FIGS. 1-6 to implement adaptive energy limiting for transient noise suppression. In some aspects, the system 700 is implemented as a component of or embodied on a user equipment device or base station. For example, the system 700 may be implemented as a system of hardware-based components, such as, and without limitation, a field-programmable gate array (FPGA), an application-specific integrated circuit (ASIC), an application-specific standard product (ASSP), a system-on-chip (SoC), a system-in-package, a complex programmable logic device (CPLD), audio codec, audio processor, co-processor, context hub, communication co-processor, sensor co-processor, or the like.

The system 700 includes communication devices 702 that enable wired and/or wireless communication of system data 704 (e.g., encoded audio data or audio signals). The system data 704 or other system content can include configuration settings of the system, media content stored on the device, and/or information associated with a user of the device. Media content stored on the system 700 may include any type of audio, video, and/or image data. The system 700 includes one or more data inputs 706 via which any type of data, media content, and/or inputs can be received, such as human utterances, speech, interactions with a radar field, user-selectable inputs (explicit or implicit), messages, music, television media content, recorded video content, and any other type of audio, video, and/or image data received from any content and/or data source.

The system 700 also includes communication interfaces 708, which can be implemented as any one or more of a serial and/or parallel interface, a wireless interface, a network interface, a modem, and as any other type of communication interface. Communication interfaces 708 provide a connection and/or communication links between the system 700 and a communication network by which other electronic, computing, and communication devices communicate data with the system 700.

The system 700 includes one or more processors 710 (e.g., any of microprocessors, controllers, and the like), which process various computer-executable instructions to control the operation of the system 700 and to enable techniques for, or in which can be embodied, adaptive energy limiting for transient noise suppression. Alternately or additionally, the system 700 can be implemented with any one or combination of hardware, firmware, or fixed logic circuitry that is implemented in connection with processing and control circuits, which are generally identified at 712. Although not shown, the system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The system 700 also includes computer-readable media 714 (CRM 714), such as one or more memory devices that enable persistent and/or non-transitory data storage, and thus do not include transitory signals or carrier waves. Examples of the CRM 714 include random access memory (RAM), non-volatile memory (e.g., any one or more of a read-only memory (ROM), flash memory, EPROM, EEPROM, etc.), or a disk storage device. A disk storage device may be implemented as a magnetic or an optical storage device, such as a hard disk drive, a recordable and/or rewriteable compact disc (CD), any type of a digital versatile disc (DVD), and the like. The system 700 can also include a mass storage media device (storage media) 716 or mass storage device interface. In this example, the system 700 also includes, or may be implemented as, an audio codec 722 to support the coding or decoding of audio signals or audio data, such as to encode audio from a microphone to provide audio signals or audio data for a conference service or voice call.

The computer-readable media 714 provides data storage mechanisms to store the device data, as well as various system applications 718 and any other types of information and/or data related to operational aspects of the system 700. For example, an operating system 720 can be maintained as a computer application with the computer-readable media 714, executed on the processors 710. The system applications 718 may include a system manager, such as any form of a control application, software application, signal-processing and control module, code that is native to a particular device, an abstraction module or gesture module and so on. The system applications 718 also include system components and utilities to implement adaptive energy limiting for transient noise suppression, such as the adaptive limiter 110, neural network 112, and voice activity detector 114. While not shown, one or more elements of the adaptive limiter 110, neural network 112, or voice activity detector 114 may be implemented, in whole or in part, through hardware or firmware.

Although the above-described devices, systems, and methods are described in the context of adaptive energy limiting for transient noise suppression in an audio/video conference environment, the described devices, systems, or methods are non-limiting and may apply to other contexts, user equipment deployments, or audio-based communication environments.

Further to the descriptions above, a user may be provided with controls allowing the user to make an election as to both if and when systems, programs, and/or features described herein may enable collection of user information (e.g., audio, sounds, voice, speech, a user's preferences, a user's current location) and if the user is sent content and/or communications from a server. In addition, certain data may be treated in one or more ways before it is stored or used, so that personally identifiable information is removed. For example, a user's identity may be treated so that no personally identifiable information can be determined for the user. For example, a user's geographic location may be generalized where location information is obtained (such as to a city, postal code, or state/province level), so that a particular location of a user cannot be determined. Thus, the user may have control over what information (e.g., audio) is collected about the user, how that information is used, and what information is provided to the user.

What is claimed is:

1. A method comprising:
setting a ceiling level of a limiter module through which audio signals pass to a full-scale level;
receiving, via a data interface, data that comprises a portion of a first audio signal, the first audio signal being one of the audio signals that pass through the limiter module;
determining a maximum amplitude of the portion of the first audio signal;
evaluating the portion of the first audio signal with a neural network to provide a voice likelihood estimate for the portion of the first audio signal;
determining, based on the maximum amplitude and the voice likelihood estimate, that the portion of the first audio signal includes noise;
decreasing the ceiling level of the limiter module from the full-scale level to a decreased ceiling level in response to determining that the portion of the first audio signal includes noise; and
providing, to the limiter module through which the audio signals pass, the decreased ceiling level to limit an amount of energy of the first audio signal.

2. The method of claim 1, wherein the data is first data, the first data is received from a first device associated with a conferencing service, and the method further comprises:
limiting, via the limiter module, the amount of energy of the first audio signal based on the decreased ceiling level to provide a second audio signal; and
transmitting, via the data interface, second data that comprises the second audio signal to at least a second device associated with the conferencing service.

3. The method of claim 1, wherein the portion of the first audio signal is a frame of audio that corresponds to the portion of the first audio signal and the method further comprises:
prior to evaluating the frame of audio, converting the frame of audio from a time domain to a frequency domain.

4. The method of claim 3, wherein the frame of audio is a first frame of audio and the method further comprises:
receiving a second frame of audio that corresponds to a second portion of the first audio signal;
evaluating the second frame of audio with the neural network to provide a respective voice likelihood estimate for the second frame of audio;
determining, based on the respective voice likelihood estimate, that the second frame of audio includes speech; and
setting the ceiling level of the limiter module to the full-scale level.

5. The method of claim 3, wherein the frame of audio is a first frame of audio and the method further comprises:
receiving a second frame of audio that corresponds to a second portion of the first audio signal;
determining a respective maximum amplitude of the second frame of audio;
comparing the respective maximum amplitude of the second frame of audio to a threshold that corresponds to an average of respective maximum amplitudes of multiple frames of audio that correspond to multiple respective portions of the first audio signal; and
maintaining a current ceiling level of the limiter module in response to the respective amplitude of the second frame of audio not exceeding the threshold.

6. The method of claim 3, wherein the frame of audio corresponds to a duration of audio that ranges from approximately 10 milliseconds of the audio to approximately 50 milliseconds of the audio.

7. The method of claim 1, wherein evaluating the portion of the first audio signal with the neural network to provide the voice likelihood estimate includes analyzing the portion of the first audio signal with a neural network-enabled voice activity detector (VAD) to provide an instantaneous voice likelihood (IVL) for the portion of the first audio signal.

8. The method of claim 7, wherein the ceiling level of the limiter module is decreased by a predefined amount to provide the decreased ceiling level and the method further comprises:
determining an aggregate speech likelihood estimate (ASLE) based on multiple IVLs provided by the neural network-enabled VAD;
updating, based on the IVL, an aggregate speech likelihood estimate (ASLE) by:
increasing the ASLE in response to the IVL exceeding the ASLE and exceeding a threshold for voice detection; or
decreasing the ASLE in response to the IVL not exceeding the ASLE or not exceeding the threshold for voice detection; and
setting the predefined amount by which the ceiling level of the limiter module is decreased based on the ASLE.

9. The method of claim 8, wherein the ceiling level of the limiter module has a minimum value and the method further comprises:
configuring the minimum value of the ceiling level based on the ASLE and one of:
an average of respective amplitudes of multiple portions of the first audio signal; or
an average of respective maximum amplitudes of multiple portions of the first audio signal.

10. An apparatus comprising:
a data interface to receive or transmit audio data over a data network;
a limiter module to limit energy of audio signals that correspond to the audio data;
a hardware-based processor associated with the data interface; and storage media storing processor-executable instructions that, responsive to execution by the hardware-based processor, implement an adaptive energy limiter configured to:
- set a ceiling level of the limiter module for the audio signals to a full-scale level;
- determine a maximum amplitude for a portion of a first audio signal, the first audio signal being one of the audio signals that pass through the limiter module;
- evaluate the portion of the first audio signal with a neural network to provide a voice likelihood estimate for the portion of the first audio signal;
- determine, based on the maximum amplitude and the voice likelihood estimate, that the portion of the first audio signal includes noise;
- decrease the ceiling level of the limiter module from the full-scale level to a decreased ceiling level in response to the determination that the portion of the first audio signal includes noise; and
- provide, to the limiter module, the decreased ceiling level to reduce the energy of the portion of the first audio signal.

11. The apparatus of claim 10, wherein:
the limiter module is configured to limit the energy of the first audio signal based on the decreased ceiling level to provide a second audio signal; and
the storage media stores additional processor-executable instructions that, responsive to execution by the hardware-based processor, implement a conferencing service configured to:
- receive, via the data interface, first data that corresponds to the first audio signal from a first device associated with the conferencing service; and
- transmit, via the data interface, second data that corresponds to the second audio signal to at least a second device associated with the conferencing service.

12. The apparatus of claim 10, wherein the adaptive energy limiter is further implemented to:
- capture, from the first audio signal, a frame of audio as the portion of the first audio signal; and
- convert the frame of the audio from a time domain to a frequency domain for evaluation by the neural network.

13. The apparatus of claim 12, wherein the frame of audio is a first frame of audio and the adaptive energy limiter is further implemented to:
- capture a second frame of audio that corresponds to a second portion of the first audio signal;
- convert the second frame of audio from the time domain to the frequency domain;
- evaluate the second frame of audio of the first audio signal with the neural network to provide a respective voice likelihood estimate for the second frame of audio;
- determine, based on the respective voice likelihood estimate, that the second frame of audio includes speech; and
- set the ceiling level of the limiter module to the full-scale level.

14. The apparatus of claim 12, wherein the frame of audio is a first frame of audio and the adaptive energy limiter is further implemented to:
- capture a second frame of audio that corresponds to a second portion of the first audio signal;
- determine a respective maximum amplitude of the second frame of audio;
- compare the respective maximum amplitude of the second frame of audio to a threshold that corresponds to an average of respective maximum amplitudes of multiple frames of audio that correspond to multiple respective portions of the first audio signal; and
- maintain the ceiling level of the limiter module at a current ceiling level in response to the respective amplitude of the second frame of audio not exceeding the threshold.

15. The apparatus of claim 12, wherein the frame of audio corresponds to a duration of audio information from the first audio signal ranging from approximately five milliseconds of the audio information to approximately 50 milliseconds of the audio information.

16. The apparatus of claim 10, wherein the neural network includes a voice activity detector (VAD) and the adaptive energy limiter is further implemented to use the VAD of the neural network to provide the voice likelihood estimate as an instantaneous voice likelihood (IVL) for the portion of the first audio signal.

17. The apparatus of claim 16, wherein the adaptive energy limiter decreases the ceiling level of the limiter module by a predefined amount and the adaptive energy limiter is further implemented to:
- determine an aggregate speech likelihood estimate (ASLE) based on multiple IVLs provided by the VAD of the neural network;
- update, based on the IVL, an aggregate speech likelihood estimate (ASLE) by:
  - increasing the ASLE in response to the IVL exceeding the ASLE and exceeding a threshold for voice detection; or
  - decreasing the ASLE in response to the IVL not exceeding the ASLE or not exceeding the threshold for voice detection; and
- set the predefined amount by which the ceiling level of the limiter module is decreased based on the ASLE.

18. A system comprising:
a hardware-based processor operably associated with a data interface by which audio data is communicated; and
storage media storing processor-executable instructions that, responsive to execution by the hardware-based processor, implement a conferencing service configured to:
- set a ceiling level of a limiter module through which audio signals of the audio data pass to a full-scale level;
- receive, via the data interface, a portion of the audio data that corresponds to a first audio signal, the first audio signal being one of the audio signals that pass through the limiter module;
- generate, based on the first audio signal, a frame of audio that corresponds to a duration of audio of the first audio signal;
- determine, for the frame of audio, a maximum amplitude of the first audio signal;
- determine, for the frame of audio, a voice likelihood estimate for the frame of audio using a neural network;
- determine, based on the maximum amplitude and the voice likelihood estimate, that the frame of audio includes noise;
- decrease the ceiling level of the limiter module from the full-scale level to a decreased ceiling level in response to the determination that the frame of audio includes noise; and
- provide, to the limiter module through which the audio signals pass, the decreased ceiling level to reduce an amount of energy of the first audio signal.

19. The system of claim 18, wherein:
the portion of audio data is a first portion of audio data that corresponds to the first audio signal, the first portion of audio data received from a first device associated with the conferencing service; and
the conferencing service is further configured to:
  limit, via the limiter module, the amount of energy of the first audio signal based on the decreased ceiling level to provide a second audio signal; and
  transmit, via the data interface, second audio data that corresponds to the second audio signal to at least a second device associated with the conferencing service.

20. The system of claim 18, wherein the system is embodied as one of an audio conference system, a cloud-based conferencing service, a video conference system, an application-specific integrated circuit, an application-specific standard product, a system-on-chip, a system-in-package, a complex programmable logic device, audio codec, or audio processor.

* * * * *